US010129027B1

(12) United States Patent
Juels et al.

(10) Patent No.: US 10,129,027 B1
(45) Date of Patent: *Nov. 13, 2018

(54) SECURITY ALERTING SYSTEM WITH DYNAMIC BUFFER SIZE ADAPTION

(71) Applicant: EMC IP Holding Company LLC, Hopkinton, MA (US)

(72) Inventors: Ari Juels, Brookline, MA (US); Nikolaos Triandopoulos, Arlington, MA (US); Kevin D. Bowers, Melrose, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/901,254

(22) Filed: Feb. 21, 2018

Related U.S. Application Data

(63) Continuation of application No. 13/922,718, filed on Jun. 20, 2013, now Pat. No. 9,935,770, which is a continuation-in-part of application No. 13/537,981, filed on Jun. 29, 2012, now Pat. No. 9,160,539.

(51) Int. Cl.
G06F 11/30 (2006.01)
G06F 21/64 (2013.01)
H04L 1/00 (2006.01)
H04L 9/32 (2006.01)

(52) U.S. Cl.
CPC ............... H04L 9/32 (2013.01); G06F 11/30 (2013.01); G06F 11/3003 (2013.01); G06F 21/64 (2013.01); H04L 1/00 (2013.01)

(58) Field of Classification Search
CPC ... H04L 1/00; H04L 9/32; G06F 11/30; G06F 11/3003; G06F 21/64
See application file for complete search history.

(56) References Cited

U.S. PATENT DOCUMENTS 6,307,899 B1 * 10/2001 Starr ........................ H04L 1/20
375/227
7,095,850 B1 * 8/2006 McGrew ................. H04L 9/065
380/37
8,605,605 B1 12/2013 Vadlakonda et al.
(Continued)

FOREIGN PATENT DOCUMENTS

WO 2011144554 A1 11/2011

Primary Examiner — Joseph P Hirl
Assistant Examiner — Kalish Bell
(74) Attorney, Agent, or Firm — Ryan, Mason & Lewis, LLP

(57) ABSTRACT

A Security Alerting System is provided with dynamic buffer size adaptation. An alert message from a Security Alerting System is transmitted by obtaining the alert message from the Security Alerting System; authenticating the alert message using a secret key known by a server; storing the authenticated alert message in a buffer; transmitting the buffer to the server; and detecting a truncation attack based on generating different cryptographic keys for protection of inserted messages and transmitted buffers, wherein the cryptographic keys for protection of inserted messages are generated in a forward-secure manner in a same order that the messages are inserted in the buffer and wherein the cryptographic keys for protection of transmitted buffers are generated in a forward-secure manner in a same order that the buffers are transmitted over a network.

20 Claims, 2 Drawing Sheets

(56) References Cited

U.S. PATENT DOCUMENTS

| | | | |
|---|---|---|---|
| 2004/0049693 A1* | 3/2004 | Douglas | G06F 21/552 |
| | | | 726/23 |
| 2006/0222080 A1 | 10/2006 | Wang | |
| 2007/0180533 A1 | 8/2007 | Ramaiah et al. | |
| 2008/0295175 A1* | 11/2008 | Ansari | H04L 63/1416 |
| | | | 726/23 |
| 2011/0096862 A1 | 4/2011 | Kuri et al. | |
| 2011/0119487 A1* | 5/2011 | Alexander | H04L 9/0891 |
| | | | 713/160 |
| 2013/0324145 A1 | 12/2013 | Tabet et al. | |
| 2014/0149744 A1 | 5/2014 | Brier et al. | |

\* cited by examiner

SECURITY ALERTING SYSTEM WITH DYNAMIC BUFFER SIZE ADAPTION

CROSS-REFERENCE TO RELATED APPLICATIONS

The present application is a continuation of U.S. patent application Ser. No. 13/922,718, filed Jun. 20, 2013, entitled "Security Alerting System with Dynamic Buffer Size Adaptation," now U.S. Pat. No. 9,935,770, which is a continuation-in-part of U.S. patent application Ser. No. 13/537,981, filed Jun. 29, 2012, entitled "Methods and Apparatus for Secure and Reliable Transmission of Alert Messages from a Security Alerting System," now U.S. Pat. No. 9,160,539, incorporated by reference herein.

FIELD OF THE INVENTION

The present invention relates generally to techniques for secure transmission of messages over a network or other types of communication systems.

BACKGROUND OF THE INVENTION

Security Alerting Systems (SASs) generate security-related alert messages indicating a potential compromise of a protected resource, such as a computing device. The alerts are transmitted to a trusted receiver for analysis and action. U.S. patent application Ser. No. 13/537,981, filed Jun. 29, 2012, entitled "Methods and Apparatus for Secure and Reliable Transmission of Alert Messages from a Security Alerting System," now U.S. Pat. No. 9,160,539, discloses methods and apparatus for secure transmission of alert messages over a message locking channel (MLC). Alert messages are buffered at the monitored endpoint and transmitted to a collection server, such as a Security Information Event Management (SIEM) server, for further security analytics processing.

In a buffer overwrite attack, an attacker that has compromised the endpoint host may insert benign-looking fake alert messages into the buffer so that meaningful and attack-indicative alerts that were previously entered in the buffer are overwritten (and thus lost) before the next scheduled buffer transmission. Buffer overwrite attacks can be detected using a gap-rule check at the collection server where a special alert is raised if two consecutive buffers are received containing alerts that are not overlapping, i.e., a gap in the sequence of received alerts has been detected.

If there is a prolonged period of disconnection between the client and the collection server, then alerts residing in the buffer may be naturally overwritten, even without any adversarial action. Thus, when the connection is restored, the next buffer transmission will miss some alert messages. The buffer should not be enlarged incrementally by one slot at a time, specifically to accommodate new alerts, however, because the buffer size would then provide a post-compromise indication of whether alerts were recorded prior to compromise.

A need therefore exists for a dynamic storage adaptation policy where the buffer size is established in a dynamic manner so that alert messages are not lost in the event of a prolonged disconnection between the endpoint host and the remote collection server.

SUMMARY OF THE INVENTION

The present invention in the illustrative embodiments described herein provides a Security Alerting System with dynamic buffer size adaptation. According to one aspect of the invention, an alert message from a Security Alerting System indicating a potential compromise of a protected resource is transmitted by obtaining the alert message from the Security Alerting System; authenticating the alert message using a secret key known by a server, wherein the secret key evolves in a forward-secure manner; storing the authenticated alert message in a buffer; transmitting the buffer to the server; and detecting a truncation attack based on generating different cryptographic keys for protection of inserted messages and transmitted buffers, wherein the cryptographic keys for protection of inserted messages are generated in a forward-secure manner in a same order that the messages are inserted in the buffer and wherein the cryptographic keys for protection of transmitted buffers are generated in a forward-secure manner in a same order that the buffers are transmitted over a network, wherein each cryptographic key is identified as being one of a "message" protection key and a "buffer" protection key.

Among other benefits, the alert messages permit real-time detection of the potential compromise of the protected resource. These and other features and advantages of the present invention will become more readily apparent from the accompanying drawings and the following detailed description.

DETAILED DESCRIPTION

Figure 1:
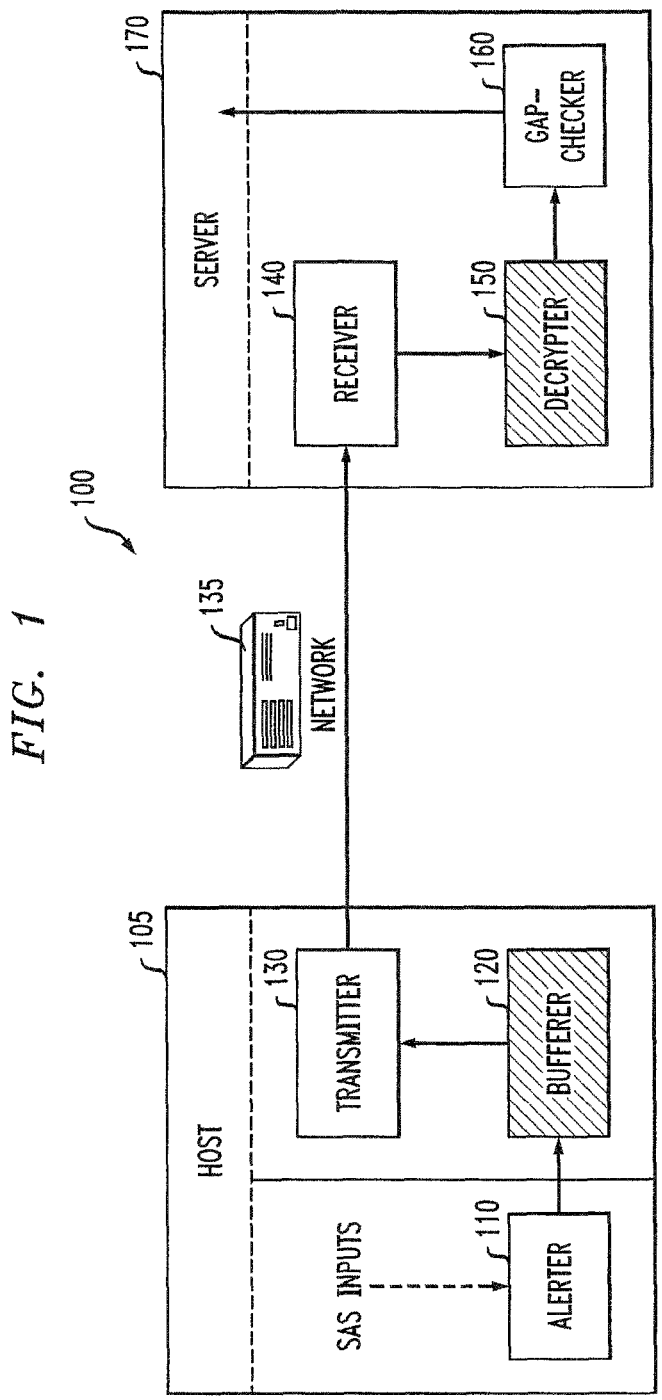
FIG. 1 illustrates an exemplary message locking channel and corresponding system architecture for reliable collection of security alerts that incorporate aspects of the present invention.

The present invention provides methods and apparatus for secure transmission of alert messages over a message locking channel using dynamic buffer size allocation. According to one aspect of the invention, the buffer size is adjusted as a function of the time since the last network connection between the monitored endpoint device and the server. In one exemplary embodiment, the buffer is initialized to a size R. On a regular basis (e.g., hourly), the size of the buffer is increased to R+S(l+1), where l denotes the number of intervals (e.g., hours) that have passed since the last alert message transmission and S denotes the increment of the buffer size per interval (e.g., per hour). New buffer slots are added to the buffer at the location of the current write pointer (that may vary over time), so that new blocks are filled first. When a connection is reestablished, the size of the buffer may again be reduced to size R, keeping the most recently written elements (the R buffer slots behind the current write pointer). As buffer size is determined merely by connection history, and not by alerting history or, in particular, the buffer's state (e.g., contents), buffer-size-adjustment policies do not leak information about alerts.

Aspects of the present invention thus provide dynamic buffer adaptation in a manner that preserves the stealth property with respect to the alerting activity of the underlying SAS system.

Message-Locking Channels

Message-locking channels secure alert messages and ensure their delivery (or a telltale delivery-failure) after compromise, while they are still buffered on the host. Messages should be protected against deletion and tampering on a device that the attacker controls, i.e., they need integrity. Messages should also be concealed. To ensure that an attacker cannot learn whether an SAS has detected the presence of the attacker, it should not be possible to learn whether there are any buffered alert messages at all (i.e., stealthiness). As discussed hereinafter, the problem of message integrity is largely addressed using forward-secure logging, in which message-signing keys are continuously generated and then discarded after use, so messages cannot be replaced.

A message-locking channel (MLC) provides forward-secure integrity and encryption. By combining cryptographic protections with a data structure and buffer transmission protocol that are invariant to the number of alert messages and their buffering history, the MLCs also provide stealthiness.

The exemplary message-locking channels (MLC) confer three properties on messages inserted into the channel via a host-side buffer:

(i) Integrity: Even after compromising a host and learning its full state (including cryptographic keys), an adversary cannot modify, reorder, or otherwise tamper with buffered messages without detection. Note that a digital signature (or message-authentication code (MAC)) alone does not achieve this property: An adversary learns the signing key after host compromise and can forge messages. That is why forward security is an important part of the MLC.

(ii) Stealthiness: An adversary cannot tell what messages are present in an MLC buffer, i.e., messages enjoy confidentiality. But the stealthiness property of an MLC is even stronger than confidentiality: A powerful adversary, one that intercepts all host-to-server transmissions prior to compromise and learns the full state of the host after compromise, cannot tell if any messages have been inserted into the buffer.

(iii) Persistence: Buffer contents may be retransmitted an arbitrary number of times without loss of forward-secure integrity or stealthiness, ensuring that even isolated alert messages of rare events eventually reach the trusted service despite possible transmission failures.

As indicated above, an MLC secures the host-to-server chain of custody in an SAS system. The exemplary MLC implements a low-level crypto-assisted reliable channel that, even under adversarial conditions, ensures intact and stealthy delivery of transmitted messages to a remote server.

FIG. 1 illustrates an exemplary message-locking channel 100 and corresponding system architecture for reliable collection of security alerts in which aspects of the present invention may be employed. As discussed hereinafter, the exemplary message-locking channel 100 comprises a bufferer 120 and a decrypter 150. The SAS components that generate alert messages are generally referred to in FIG. 1 as an alerter module 110. Generally, the alerter module 110 monitors the environment of a host 105 to identify events that match one of a set of specified alert rules. When an event triggers a rule, the alerter 110 outputs a distinct alert message. An alert template may either be static (predefined at some setup time for the host 105) or dynamic (updated regularly or on-demand through communication with the server 170). Rules may take any form. Rules may test individual state variables (specified as what is generally called a signature) or they may correlate more than one event via a predicate or classifier. Moreover, as the present invention supports stealthy erasure of rules, it permits enhanced functionality in the alerter 110. The alerter 110 may tag select rules as "vanishing." When such a rule is triggered, the rule is erased from the current rule set.

The interface of the exemplary alerter 110 is unidirectional. The alerter 110 outputs alert messages that are consumed by the message-locking channel. Although many architectures are possible, given the emphasis on critical alerts, in a canonical operational setting, the SAS 110 may send only high severity messages (e.g., those that seem to indicate impending compromise) through the message-locking channel, and other less critical messages through an ordinary low-priority transport layer. This high-priority channel will carry less traffic and thus will impose lower overhead due to buffer retransmissions.

As shown in FIG. 1, a bufferer module 120 controls the MLC core message buffer. The bufferer 120 receives messages from the alerter 110 and inserts them into the buffer. The bufferer 120 also receives buffer-wrapping requests from the transmitter 130 and responds by returning the current buffer contents in a securely encapsulated form. The bufferer module 120 is also responsible for maintaining the secret state of the MLC and updating cryptographic keys. The exemplary bufferer 120 accepts two calls: a Write call from the alerter 110 to insert a message to the MLC buffer and a Wrap call from the transmitter 130 requesting encapsulated export of the buffer contents. The bufferer 120 does not discard messages from the buffer when they are transmitted. A message keeps being encapsulated and transmitted until it is overwritten. This is the feature of persistence that helps overcome adversarial network disruptions.

In addition, the bufferer 120 comprises processing software, hardware and memory (not shown in FIG. 1) to implement a Dynamic Buffer Adaptation Process 200, discussed further below in conjunction with FIG. 2, that incorporates aspects of the present invention. It is noted that in one exemplary embodiment, the detection of disrupted connectivity is performed at least in part by the transmitter 130.

A transmitter module 130 schedules and executes buffer transmissions from the host 105 to the server 170. In a basic implementation, transmissions may be scheduled at regular intervals of time as a "heartbeat." The transmitter module 130 sends Wrap requests to the bufferer 120 and transmits encapsulated buffers to the server 170 over the network 135 using any suitable protocol.

A receiver module 140 receives encapsulated-buffer transmissions on the server 170 from the host-based transmitter 130 over the network 135. When the receiver module 140 receives a transmission pushed from the host 105, the receiver module 140 relays it with a Read instruction to a decrypter 150.

The decrypter 150, in response to a Read request from the receiver 140, performs cryptographic unwrapping and processing of the accompanying encapsulated buffer. The decrypter 150 verifies the integrity of the buffer and either outputs its constituent messages, or else outputs a 1 symbol indicating a buffer corruption. The decrypter 150 labels messages with their (verified) buffer sequence numbers.

A gap-checker 160 looks for lost messages in the SAS message stream, which cause it to output an alert referred to as a gap alert. Gap alerts may be caused by one of two things: (1) Dropped or suppressed buffers or (2) Overwriting of alerts in the buffer by malicious buffer-stuffing on the compromised host 105, as discussed herein.

As buffer messages are labeled with verified sequence numbers, gap checking requires verification that no sequence numbers go missing in the message stream. Because messages continue to be transmitted until overwritten, note that in normal operation sequence numbers will generally overlap between buffers. The gap-checker 160 can optionally filter out redundant messages.

To detect an adversary that suppresses buffer transmission completely, the gap-checker 160 also issues a gap alert if buffers have stopped arriving for an extended period of time, as discussed below.

The gap checker 160 detects when a true gap occurs, i.e., there are no false-negatives in its gap-alert output. To ensure a low false-positive rate, i.e., to prevent spurious detection of maliciously created gaps, calibration is required.

If an attacker suppresses buffer transmission completely, then the gap-checker 160 will cease to receive buffers. This is a detectable event. The gap-checker 160 issues a gap alert if more than β seconds have elapsed without the receipt of a buffer.

It can be shown that the false-positive gap-alert rate can be low with moderate buffer sizes under non-adversarial conditions.

The exemplary MLC buffer is a first-in-first-out (FIFO) buffer with wraparound. Any tampering with the buffer or writing of invalid messages causes its contents to be indelibly replaced with a special corruption symbol ⊥ (again, in a cryptographic abstraction). Each encapsulated buffer is labeled with a forward-secure sequence number j, meaning that even after complete compromise, an attacker can only increase it, not decrease it. Each encapsulated buffer also carries the current message sequence number $s_j$.

The goal of an adversary when compromising a host 105 is to suppress buffered alerts generated during the critical window of infection. The adversary can do so during the post-compromise period, for example, using a buffer overwriting attack, whereby an adversary can write messages into the MLC buffer without destroying it. By writing relatively benign messages, i.e., exploiting buffer wraparound to refill the buffer, it can overwrite and thereby destroy messages generated during the critical window.

The sender S maintains the following three components of state information:

1. a secret key σ (also kept by the receiver R);
2. a buffer C, C=(C[0], C[1], . . . , C[R−1]), initially empty, seen as an array of size R+1, where C[i], 0≤i≤R, denotes the ith position in C;
3. a current index I, initially pointing to a random position in C, and itself stored at C[R].

The buffer data structure is implemented as a class that exports two methods: Write and Wrap. When the host-based application is started it creates a new buffer, which remains held in memory, and interacts with the bufferer 120 and transmitter 130. The size of the buffer is specified at creation time and its starting position is randomly selected.

For a more detailed discussion of the MLC and other components of FIG. 1, see U.S. patent application Ser. No. 13/537,981, filed Jun. 29, 2012, entitled "Methods and Apparatus for Secure and Reliable Transmission of Alert Messages from a Security Alerting System," now U.S. Pat. No. 9,160,539, incorporated by reference herein.

Dynamic Buffer Adaptation

Dynamic buffer adaptation occurs while there is a detected prolonged network disruption. As indicated above, the buffer C is initialized to a size R. On a regular basis, such as hourly, the size of the buffer is increased to R+S(l+1), where l denotes the number of intervals that have passed since the last alert message transmission and S denotes the increment of the buffer size per interval (e.g., per hour). New buffer slots are added to the buffer at the location of the current write pointer (that may vary over time), so that new blocks are filled first. When a connection is reestablished, the size of the buffer may again be reduced to size R, keeping the most recently written elements (the R buffer slots behind the current write pointer).

To ensure moderate communication and server-side processing costs, it is helpful to make R as small as possible for the system parameter of transmission interval μ (that is, the time between snapshots of buffers sent by the host). During prolonged buffer transmission failures, however, even benign ones, a small buffer size R can result in the loss, i.e., overwriting, of alert messages. Unfortunately, enlarging B on demand as new alerts are generated cannot solve this problem, because the size R would then correlate with alerting history, and the stealth property would be lost.

When the host 105 can detect a loss of its network connection with the server 170, however, it is possible to keep R small, yet preserve alert messages during periods of disconnection. The size of the buffer B is dynamically increased as a function of the time elapsed since the last successful connection. Note that the detection of network connection failures does not require server message acknowledgements. For instance, an enterprise device can simply observe whether it is connected to the enterprise network. For example, after every hour of lost network connection, S extra slots may be added to B on the host 105. New buffer slots are inserted at the position of the current index I of B, to ensure that new slots are used before old ones are overwritten.

When the connection is re-established, the size of the buffer B may again be reduced to size R. The most recently written R slots, behind pointer I, are retained. However, to ensure that the alert messages that are currently stored in the other older slots (which are to be deleted from the buffer) have been indeed delivered by the collection server, the shrinking of buffer B can optionally be performed in a conservative or slow manner, namely after d buffer transmissions of the increased size have been performed by the host. Here, d is an additional system parameter that is decided either at setup or dynamically by the host.

With the above approach, R is a function of connection history, not alerting history, and stealth is preserved. At the same time, an adversary cannot simulate a benign host disconnection and then overwrite alerts: The server 170 can record disconnection periods and adjust its expectation of buffer B transmission sizes from the host 105 accordingly.

Figure 2:
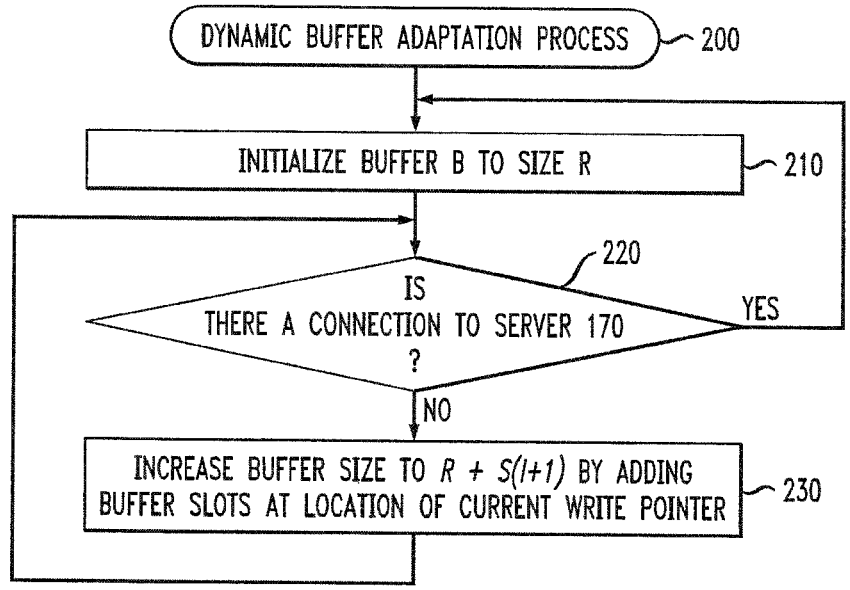
FIG. 2 is a flow chart describing an exemplary implementation of a dynamic buffer adaptation process incorporating aspects of the present invention.

FIG. 2 is a flow chart describing an exemplary implementation of a dynamic buffer adaptation process 200 incorporating aspects of the present invention. As shown in FIG. 2, the exemplary dynamic buffer adaptation process 200 initializes the buffer B to size R during step 210.

A test is performed during step 220 to determine if there is a connection to server 170. If it is determined during step 220 that there is no connection to server 170, then increase buffer size to R+S(l+1) by adding buffer slots at the location of the current write pointer during step 230. If, however, it is determined during step 220 that there is a connection to server 170, then program control returns to step 210 to re-initialize the buffer B to size R.

Figure 3:
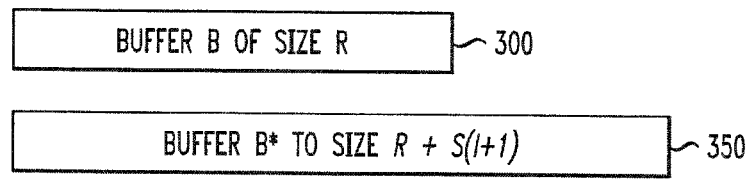
FIG. 3 illustrates a buffer B that initially has a size of R and the same buffer B* at a later time that has been increased to a size of R+S(l+1) following a period of disconnection.

FIG. 3 illustrates a buffer B at a time 300 that initially has a size of R and the same buffer B* at a time 350 that has been increased to a size of R+S(l+1) after a period of disconnection.

Truncation Attacks

In a truncation attack of a security log, an attacker that fully compromises an endpoint host deletes a "suffix" of the set of recorded logs, i.e., the, say j, most recently stored logs. In some cases this attack cannot be detected.

In the present context, the attack corresponds to deleting the j alert messages that were most recently inserted in the buffer B, where $j<|B|$ is chosen by the adversary to be large enough so some alerts that are indicative of the host compromise are permanently deleted. By construction, the MLC is secure against such truncation attacks: Indeed, given that B is a fixed-size buffer, deletion of the "suffix" of the alerting history is not possible, because the attacker will have to report exactly B alerts, thus the attacker will have to forge exactly j alert messages.

The disclosed buffer adaptation approach may allow for a special type of truncation attack. Specifically, an attacker may:
1. first disrupt the network connectivity of a victim host 105 (e.g., through a DOS attack; this will force the host 105 to identify an attacker-produced loss of connection to the collection server 170 and, in turn, to adapt to an updated buffer B' of a larger buffer size;
2. then perform an attack against the host 105 that would lead to its full compromise;
3. then permanently delete the newly added extra slot of the buffer B' which will be the first to be used in order to secure the alerts indicating the host compromise;
4. then keep transmitting the old buffer B to the collection server 170.

This way, the attacker has succeeded in permanently hiding a wide enough window of alerts from the server 170, which most likely contains all the alerts that indicated the compromise of the host 105 by the attacker. This attack is possible due to the fact that new and old slots are not securely bound together, thus allowing this special truncation attack.

This attack can be prevented by adopting (at least) one of the following three extensions that are designed to securely bind the newly added slots to the old buffer slots:
1. Along with the alert messages, the current index I is stored in the buffer B which indicates the beginning of the buffer, i.e., the position of the next-to-be-written slot. The buffer is augmented to also store a forward-secure counter of the total number of buffer adaptations (through a buffer enlargement or shrinking). This secure counter can be implemented as a hash chain over an initial, fixed at setup, value V, so that after the first buffer adaptation, the counter takes on the value $v_1$=h (V), where h is a cryptographic collision-resistant hash function. Then, after the i-th buffer adaptation, i>1, the new counter value is $v_i$=h($v_{i-1}$). Accordingly, for any received buffer, the server 170 will check the consistency of its contained counter value with respect to the hash chain. As an additional augmentation, whether the buffer adaptation corresponds to an enlargement or shrinking can be encoded by setting $v_i$=h($v_{i-1}$Pb), where b=0 or b=1 if the buffer's size is increased or decreased respectively.

This special encoding does not increase the search space at the server 170 with respect to the computation of the next forward-secure counter value, mainly for two reasons: (1) Buffer adaptations are generally an infrequent event and, under network connectivity, the host 105 and the server 170 are always synchronized with respect to the current buffer transmission period (in particular, buffer transmissions are indexed); therefore, the search space is of size of only two; (2) Like any hash chain, and also for the sequence of values $v_i$ it is possible to devise hierarchical chaining schemes that reduce the search space in case where the host and the server are not synchronized.

Overall, the server 170 will be able to detect a truncation attack by employing the forward-secure counter readings to observe an inconsistency between the buffer size and the secure counter value.

2. Two separate forward-secure sequences of cryptographic keys can be employed for securing message insertions into the buffer B and buffer transmissions over the network. This is happening for simplicity and also because message insertions and buffer transmissions happen at different rates, thus separate sequences can lead to more efficient processing at the server side. However, consider an extension where these two sequences are combined into one forward-secure sequence so that:
cryptographic keys for the protection of inserted messages or transmitted buffers are generated in a forward-secure manner in the same order that the corresponding messages are inserted in the buffer or the buffers are transmitted over the network; and
each cryptographic key used as above can be identified as being a "message" or "buffer" protection key (this is helpful for facilitating the server-side management of the common forward-secure key hash chain).

For instance, a key may be generated as follows: A hash chain produces seeds $s_1, s_2, \ldots, s_i, \ldots$ in a forward secure way, then $s_i$ produces two distinct forward-secure dependent keys, one $k_{i,m}$=h($s_i$Pr$_{message}$) if the i-th operation is to protect a message, or $k_{i,b}$=h($s_i$Pr$_{buffer}$) if the i-th operation is to protect a buffer. Here, "message" and "buffer" are two special fixed values for differentiating message keys from buffer keys.

Then, note that any truncation attack can be detected by the server 170, because the transmission of the truncated buffer B (instead of buffer B') must be protected by a buffer key derived by seed $v_i$ that is a descendant of length of at least two in the hash chain of the seed $v_j$ that derived the last message key for protecting the last message that was inserted in the truncated buffer B. That is, it must be that i>j+1 (since by our assumption there is at least one alert message produced due to the attack that was stored in the newly added slots in buffer B'). This corresponds to a detectable condition at the server 170 to indicate that some messages that were inserted in the buffer were never delivered. Indeed, when i>j+1 is detected, then the only possibility left for justifying this gap between the most recent buffer transmission in time unit i and the most recent message insertion in time unit j, with i>j+1, is that there were exactly i−j−1>0 buffer transmissions that failed due to network errors. The number l of scheduled buffer transmissions, however, that must have occurred since the last successful buffer delivery is known to the server 170 (at least assuming a known upper bound on the transmission latency). Therefore, the server 170 will be able to detect that the most recent delivered buffer corresponds to a truncation attack and raise an alert flag.

Note that for this detection to be feasible, the host's functionality is extended to advance by one position the forward-secure hash chain every transmission period even if the host 105 has detected a loss of connection to the server 170 (and thus adopts the buffer adaptation policy). In this way, the hash chain perfectly encodes the total number l buffer transmissions that have occurred or should have occurred (in case of a network disconnection) at any point in time; then, by additionally binding (in a forward-secure manner) this "buffer transmission counter" to the corresponding "message insertion counter," allows detection of the inconsistency that the truncation attack resulted in.

3. In a further extension, a special alert message m* is written in the buffer anytime a buffer adaptation policy is activated. This way, the special message m* will be written to the old buffer B before the expansion of B to the enlarged buffer B'. Therefore, the truncation attack described above will be immediately detected since the old buffer will carry the special message m* which indicates an enlarged-size buffer, therefore creating the required inconsistency. Note that this special message m* will be automatically removed when buffer B' will next be reduced to a smaller size buffer B"; indeed, in this case the older slots are being deleted, which also contain message m*.

Variable-Length Alerts

Consider the more limited case where alert messages can be of fixed size t or, more accurately, where each message that is inserted into the buffer B is of size <t and is inserted in B using an authenticated encryption to a ciphertext of size t. In another embodiment, variable-length messages are employed as follows: Instead of considering messages of fixed size t whose ciphertext is at most the size s of one slot in B, messages of variable length are relayed using the following extension: A variable-length message m of size t' is padded (in a self-delimiting way) to size k such that $sPg(k)$, making use of an authenticated encryption scheme that encrypts messages m of size k to ciphertexts of size $g(k) \geq k$, and thus the resulting ciphertext occupies $g(k)/s$ consecutive buffer slots.

Figure 4:
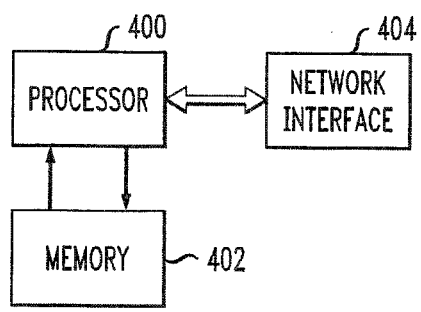
FIG. 4 shows one possible implementation of a given one of the processing devices of the disclosed message locking channel system of FIG. 1.

FIG. 4 shows one possible implementation of a given one of the processing devices of the message locking channel system. The device in this implementation includes a processor 400 coupled to a memory 402 and a network interface 404. These device elements may be implemented in whole or in part as a conventional microprocessor, digital signal processor, application-specific integrated circuit (ASIC) or other type of circuitry, as well as portions or combinations of such circuitry elements. As will be appreciated by those skilled in the art, a secure authentication protocol in accordance with the present invention can be implemented at least in part in the form of one or more software programs that are stored in device memory 402 and executed by the corresponding processor 400. The memory 402 is also used for storing information used to perform computations or other operations associated with the secure alerting protocols of the invention.

CONCLUSION

As previously indicated, the above-described embodiments of the invention are presented by way of illustrative example only. Numerous variations and other alternative embodiments may be used, as noted above. Existing Security Alerting Systems (SASs) lack countermeasures against sophisticated attackers that take control of an endpoint machine. Often during and always after complete host compromise, an attacker can destroy evidence of its malfeasance and gather intelligence about the instrumentation of the SAS.

Aspects of the present invention provide message-locking channels that advance the state of the art in SAS alert-relaying mechanisms by delivering a secure chain of custody for the stream of security alerts generated by any SAS system. The message-locking channels provide a cryptographic tool capable of transmitting alerts from a host 105 to a security-monitoring server 170 in an integrity-protected, stealthy and persistent manner.

Additional details regarding certain conventional cryptographic techniques referred to herein may be found in, e.g., A. J. Menezes et al., Handbook of Applied Cryptography, CRC Press, 1997, which is incorporated by reference herein.

The illustrative embodiments of the invention as described herein provide secure transmission of messages over a silent alarm channel. Advantageously, the illustrative embodiments do not require changes to existing communication protocols. It is therefore transparent to both existing applications and communication protocols.

It should again be emphasized that the particular authentication and communication techniques described above are provided by way of illustration, and should not be construed as limiting the present invention to any specific embodiment or group of embodiments. For example, as previously noted, the described embodiments may be adapted in a straightforward manner to operate with other types of credentials or authentication information. Also, the particular configuration of system elements, and their interactions, may be varied in other embodiments. Moreover, the various simplifying assumptions made above in the course of describing the illustrative embodiments should also be viewed as exemplary rather than as requirements or limitations of the invention. Numerous alternative embodiments within the scope of the appended claims will be readily apparent to those skilled in the art.

What is claimed is:

1. A method performed by a host for transmitting an alert message from a Security Alerting System indicating a potential compromise of a protected resource to a server, comprising:

obtaining, by at least one processing device, said alert message from said Security Alerting System;

authenticating, by said at least one processing device, said alert message using a secret key known by said server, wherein said secret key evolves in a forward-secure manner;

storing, by said at least one processing device, said authenticated alert message in a buffer, wherein a size of said buffer is based on a connection history of said Security Alerting System; and detecting, by said at least one processing device, a truncation attack based on generating different cryptographic keys for protection of inserted messages and transmitted buffers, wherein said cryptographic keys for protection of inserted messages are generated in a forward-secure manner in a same order that said messages are inserted in the buffer and wherein said cryptographic keys for protection of transmitted buffers are generated in a forward-secure manner in a same order that said buffers are transmitted over a network, wherein each cryptographic key is identified as being one of a "message" protection key and a "buffer" protection key.

2. The method of claim 1, wherein said authenticating step further comprises the step of encrypting said alert message.

3. The method of claim 1, wherein said size of said buffer is increased in proportion to a time duration of a disruption of said connection.

4. The method of claim 1, wherein said size of said buffer is increased to a size R+S(l+1), where R is an initial size of said buffer, l denotes said number of time intervals that have passed since said last alert message transmission and S denotes said increment of the buffer size per time interval.

5. The method of claim 1, wherein said size of said buffer is increased by adding buffer slots at a location of a current write pointer index.

6. The method of claim 1, further comprising the step of storing a current write pointer index value and a forward secure counter indicating a number of buffer adaptations in said buffer.

7. The method of claim 1, further comprising the step of evaluating sequence numbers of a plurality of said alert messages to detect a gap in said alert messages.

8. The method of claim 1, further comprising the step of detecting a truncation attack based on an alert message m* written in the buffer when a said size of said buffer is adjusted.

9. The method of claim 1, wherein said alert message has a variable size by writing said alert message into a plurality of consecutive slots of said buffer.

10. The method of claim 1, further comprising the step of reducing said size of said buffer when said connection is re-established.

11. The method of claim 10, wherein said reduction is delayed until a predefined number of said buffers have been transmitted on said re-established connection.

12. A non-transitory machine-readable recordable storage medium for transmitting by a host an alert message from a Security Alerting System indicating a potential compromise of a protected resource to a server, wherein said non-transitory machine-readable recordable storage medium stores one or more software programs, wherein the one or more software programs when executed by one or more processing devices implement steps comprising:
    obtaining, by at least one processing device, said alert message from said Security Alerting System;
    authenticating, by said at least one processing device, said alert message using a secret key known by said server, wherein said secret key evolves in a forward-secure manner;
    storing, by said at least one processing device, said authenticated alert message in a buffer, wherein a size of said buffer is based on a connection history of said Security Alerting System; and
    detecting, by said at least one processing device, a truncation attack based on generating different cryptographic keys for protection of inserted messages and transmitted buffers, wherein said cryptographic keys for protection of inserted messages are generated in a forward-secure manner in a same order that said messages are inserted in the buffer and wherein said cryptographic keys for protection of transmitted buffers are generated in a forward-secure manner in a same order that said buffers are transmitted over a network, wherein each cryptographic key is identified as being one of a "message" protection key and a "buffer" protection key.

13. An apparatus of a host for transmitting an alert message from a Security Alerting System indicating a potential compromise of a protected resource to a server, the apparatus comprising:
    a memory; and
    at least one processing device, coupled to the memory, operative to implement the following steps:
    obtaining, by at least one processing device, said alert message from said Security Alerting System;
    authenticating, by said at least one processing device, said alert message using a secret key known by said server, wherein said secret key evolves in a forward-secure manner;
    storing, by said at least one processing device, said authenticated alert message in a buffer, wherein a size of said buffer is based on a connection history of said Security Alerting System; and
    detecting, by said at least one processing device, a truncation attack based on generating different cryptographic keys for protection of inserted messages and transmitted buffers, wherein said cryptographic keys for protection of inserted messages are generated in a forward-secure manner in a same order that said messages are inserted in the buffer and wherein said cryptographic keys for protection of transmitted buffers are generated in a forward-secure manner in a same order that said buffers are transmitted over a network, wherein each cryptographic key is identified as being one of a "message" protection key and a "buffer" protection key.

14. The apparatus of claim 13, wherein said size of said buffer is increased in proportion to a time duration of a disruption of said connection.

15. The apparatus of claim 13, wherein said size of said buffer is increased by adding buffer slots at a location of a current write pointer index.

16. The apparatus of claim 13, wherein said at least one processing device is further configured to evaluate sequence numbers of a plurality of said alert messages to detect a gap in said alert messages.

17. The apparatus of claim 13, wherein said at least one processing device is further configured to detect a truncation attack based on an alert message m* written in the buffer when said size of said buffer is adjusted.

18. The apparatus of claim 13, wherein said alert message has a variable size by writing said alert message into a plurality of consecutive slots of said buffer.

19. The apparatus of claim 13, further comprising the step of reducing said size of said buffer when said connection is re-established.

20. The apparatus of claim 19, wherein said reduction is delayed until a predefined number of said buffers have been transmitted on said re-established connection.

* * * * *